United States Patent [19]

Simone et al.

[11] Patent Number: 4,812,533

[45] Date of Patent: Mar. 14, 1989

[54] HYDROXY ACID ESTERIFIED POLYOLS

[75] Inventors: Dominic Simone, Lincroft; Melvin Brauer, East Brunswick, both of N.J.

[73] Assignee: CasChem, Inc., Bayonne, N.J.

[21] Appl. No.: 30,402

[22] Filed: Mar. 25, 1987

[51] Int. Cl.[4] ............... C08C 19/00; C08C 19/20; C08F 8/00

[52] U.S. Cl. ................... 525/437; 525/445; 525/328.8; 525/384; 525/529; 525/533; 525/440; 525/131

[58] Field of Search ............ 525/437, 445, 328.8, 525/384, 529, 533

[56] References Cited

U.S. PATENT DOCUMENTS

| | | | |
|---|---|---|---|
| 3,523,108 | 8/1970 | Boutsicaris et al. | 525/386 |
| 3,549,600 | 12/1970 | Senge et al. | 525/386 |
| 3,574,146 | 3/1971 | Kordomenos et al. | 525/533 |
| 3,730,930 | 5/1973 | Labana | 525/386 |
| 4,224,212 | 9/1980 | Topham | 525/437 |
| 4,362,847 | 12/1982 | Kooijmans et al. | 525/533 |
| 4,404,333 | 9/1983 | Watanabe et al. | 525/437 |
| 4,535,142 | 8/1985 | Brauer et al. | 528/75 |

FOREIGN PATENT DOCUMENTS

| | | |
|---|---|---|
| 7242848 | 10/1972 | Japan . |
| 7314667 | 5/1973 | Japan . |
| 047741 | 9/1985 | Japan . |
| 212134 | 5/1986 | Japan . |

*Primary Examiner*—John Kight
*Assistant Examiner*—Dennis R. Daley
*Attorney, Agent, or Firm*—Pennie & Edmonds

[57] ABSTRACT

High viscosity or solid resins containing hydroxyl groups can be modified by esterification with ricinoleic acid to yield polyols having much lower viscosity, improved solubility in non-polar solvents, higher equivalent weights and essentially the same hydroxyl functionality of the unmodified resin. These new polyols or their mixture with other polyols can be reacted with solventless polyisocyanates to yield polyurethane compositions useful as adhesives, potting or molding compounds. Alternatively, they can be diluted with a small amount of appropriate solvents and reacted with polyisocyanate, melamine or urea-formaldehyde resins, or used in the preparation of alkyd resins, yield high solids coatings useful in a variety of applications, such as plastics, business machine parts, metals, wood and building materials such as concrete, bricks, cinder blocks and the like.

46 Claims, No Drawings

HYDROXY ACID ESTERIFIED POLYOLS

TECHNICAL FIELD

This invention relates to a novel class of high viscosity or solid polyol resins containing one or more hydroxyl groups which are modified by esterification with ricinoleic acid compounds to yield liquid polyols of relatively low viscosity at ambient temperature. These polyols, alone or diluted with a small amount of solvent, when cured with polyisocyanates, melamine or formaldehyde resins, or when used in the preparation of alkyd resins, yield solventless or high solids compositions which are useful as coatings, adhesives and potting or molding compounds.

BACKGROUND ART

Polyols are very well known to those skilled in the art due to their utility as reactants for the preparation of a variety of polymeric or resin compositions. Typical reactions include curing or crosslinking reactions with polyisocyanate materials having at least two isocyanate groups per mole, melamines or formaldehyde resins, as well as esterification reactions with unsaturated monobasic fatty acids to form alkyl resins.

One class of polyols includes polyester polyols or the hydroxy terminated polyesters. These are generally prepared by an esterification reaction of a diol or mixtures of diols and triols with a dicarboxylic acid or anhydride. Examples of suitable diols and triols are ethylene glycol, propylene glycol, 1,3 propane diol, 1,4 butane diol, neopentyl glycol, trimethylol propane and the like. Examples of such dicarboxylic acids and anhydrides are phthalic acid, phthalic anhydride, isophthalic acid, maleic acid, maleic anhydride, succinic acid, adipic acid and the like. These polyester polyols, however, are generally high viscosity resins which have to be diluted or dissolved in relatively large amounts of a suitable solvent in order to provide low viscosity, easy to apply coating compositions when mixed with a curing or crosslinking agent.

Because a large amount of solvent is required to reduce the viscosity of these polyols, they are not suitable for the formulation of high solids coatings. Also, the issuance of recently strengthened EPA (i.e., Environmental Protection Administration) regulations as well as the high cost of such solvents are forcing end users to significantly reduce the level of solvent emissions from their operations. Moreover, due to the presence of the interfering solvent, these polyols cannot be used in compounds for potting or molding applications.

Castor oil is a triglyceride ester of ricinoleic acid which contains approximately 3 hydroxyl groups per molecule. It is, therefore, a polyester polyol which can be reacted with polyisocyanates, melamine and formaldehyde resins, or used in the formation of alkyd resins. These castor oil compositions, however, have relatively poor mechanical properties and limited solvent resistance.

A second class of polyols is the acrylic polyols, which are prepared by the copolymerization of a hydroxy acrylate or methacrylate with acrylate and/or methacrylate esters or styrene. Examples of suitable monomers are hydroxyethyl acrylate, hydroxyethyl methacrylate, hydroxypropyl acrylate, hydroxypropyl methacrylate, methyl acrylate, ethyl acrylate, butyl acrylate, 2-ethyl-hexyl acrylate, methyl methacrylate, butyl methacrylate and the like.

These hydroxy-containing acrylic polymers, like the polyester polyols, are high viscosity compounds and require large amounts of solvent to provide low viscosity, easy to apply coating compositions when mixed with the desired curing or crosslinking agent. Again, due to the presence of a large amount of solvent, these polyols are also not suitable for use in high solids coatings, or for potting and molding applications.

A third class of polyols comprises polyether polyols which are prepared by the homopolymerization and copolymerization of ethylene oxide and propylene oxide. Although some of the polyols in this class have acceptable viscosity, particularly those with low molecular weights, they are not suitable for high solids coating applications because of their poor light stability, poor weathering properties and limited solvent and water resistance.

Resin compositions which contain hydroxyl groups, such as alkyd resins, are also useful as polyols for coating compositions. These resins are produced as products of an esterification reaction involving a polyhydric alcohol, i.e., a polyol such as glycerol, sorbitol, ethylene glycol or pentaerythritol, and a monobasic fatty acid, most of which are derived from natural drying and nondrying oils, such as linseed oil, soybean oil and castor oil, to form resin-based coating compositions having acceptable properties for certain applications. The resin may then optionally be further modified by the addition of a polybasic acid composition.

The reaction of hydroxyl groups with isocyanates to form urethanes is very well known. A large number of polyols and a large number of polyisocyanates are available to form polyurethane compositions useful as adhesives, potting compounds and coatings. However, due to the recent EPA regulations and the high cost of organic solvents discussed above, these industries have been forced to significantly reduce the level of solvent emission from their operations.

One approach to meeting the new EPA regulations is the utilization of high solids compositions. In the coating industry, for example, high solids coatings are generally defined as having a non volatile content of approximately 80% or a VOC, i.e., volatile organic content, of 2.8 pounds per gallon or less. The conventional hydroxyl terminated polyesters, the copolymers of hydroxy functional acrylate and methacrylate with acrylate and methacrylate esters and styrene, the copolymers of allyl alcohol and other unsaturated monomers such as styrene, and hydroxyl-containing alkyd resins cannot be used in the high solids coatings because of their high solvent requirements for preparing low viscosity solutions. Such low viscosity solutions are essential for the preparation of coatings with good atomization, leveling and flow out properties.

The reduction in the molecular weight of these resins could result in higher solids and lower viscosity solutions, but this approach has the disadvantage of producing volatile oligomers and low equivalent weight resins. The oligomers could volatilize during baking and adversely affect the solid content and the VOC of the coating. The low equivalent weight resins require larger amounts of isocyanate for curing and, therefore, their presence adds considerably to the cost of the finished coating. The most expensive ingredient in a polyurethane composition is the isocyanate and especially the aliphatic isocyanates which, because of their superior UV stability, are preferred in high solids applications.

Low molecular weight, low viscosity isocyanates could be used with some advantage in lowering the viscosity of the final compositions. This approach, however, is not acceptable because the low molecular weight isocyanates have a vapor pressure which is too high and they are known to induce respiratory and skin problems to the user as well. Therefore, the coating manufacturers have adopted the practice of using isocyanate prepolymers and adducts which are much safer to use, but have much higher viscosities than the corresponding monomeric isocyanates.

DETAILED DESCRIPTION OF THE PREFERRED EMBODIMENTS

One object of the present invention is to provide low viscosity polyols which, when mixed with solventless polyisocyanates, yield polyurethane compositions useful as adhesives, potting or molding compounds, or as coatings.

Another object of the invention is to provide low viscosity polyols with improved solubility in non-polar solvents which, when diluted with a small amount of solvents and mixed with polyisocyanate, melamine or urea-formaldehyde resins, or when used in the preparation of alkyd resins, yield high solids polyurethane compositions.

In accordance with the present invention, a number of resins containing hydroxyl groups can be esterified with ricinoleic acid, hydroxystearic acid or mixtures thereof to yield a polyester polyol with the following improved properties: (a) a much lower viscosity than the original resin; (b) an improved solubility in non-polar solvents; (c) a higher equivalent weight than the original resin; and (d) the same functionality as the original resin.

Alternatively, the high viscosity or solid resin, containing at least two hydroxyl groups is esterified with ricinoleate esters, hydroxystearic esters or mixtures thereof by a trans-esterification reaction. Any ricinoleate or hydroxystearate ester can be used but the methyl, propyl and butyl esters are preferred because of the low boiling point and the ease with which the methanol, propanol or butanol, respectively, formed during the trans-esterification reaction, is eliminated.

The lower viscosity of the polyols disclosed by the present invention thus enables coating manufacturers to use these materials in the formulation of high solids coatings. Their improved solubility in non-polar solvents enables the use of a greater amount of the lower cost, exempt solvents. The higher equivalent weight is a desirable property of a polyol because it would require less isocyanate for curing. The isocyanates, especially the aliphatic isocyanates, are much more expensive than the polyols and, therefore, a polyol requiring less isocyanate yields compositions which are much lower in cost than those polyols requiring larger amounts of isocyanates.

The functionality of a polyol is a very important property because it affects the crosslnking density of the cured composition as well as its physical and chemical properties. Since each molecule of ricinoleic acid or hydroxyl stearic acid has a hydroxyl group, the reaction product of a resin formulated with the use of these acids has the same functionality as the original resin.

Any resin which is stable at the reaction temperature and which contains hydroxyl groups can be used in the preparation of the polyols of the present invention. These include the hydroxy-terminated polyesters, the copolymers of allyl alcohol, the copolymers of bisphenol A and epichlorohydrin, and the like. Suitable allyl alcohol copolymers are those prepared by the copolymerization reaction of allyl alcohol and vinyl monomrs such as styrene.

Suitable polyester resins are those prepared by the condensation reaction of a polyhydric alcohol, such as ethylene glycol, propylene glycol, 1-4 butane diol, 2,2-dimethyl-1,3 propane diol and trimethylol propane, and a polycarboxylic acid or anhydride compound such as oxalic acid, malonic acid, succinic acid, glutaric acid, adipic acid, phthalic acid, isophthalic acid, cyclohexane dicarboxylic acid, phthalic anhydride and the like.

The reaction of the hydroxy terminated resin with the ricinoleic acid, hydroxy stearic acid or their mixtures readily proceeds under ordinary esterifying reaction conditions, with or without an esterification catalyst, at 120°-250° C. for a period of 5-10 hours.

The minimum useful amount of ricinoleic acid, hydroxystearic acid or their mixtures is 10 percent by weight of the reactant components. The maximum is the amount necessary to react with all of the hydroxyl groups in the resin. That is, one hydroxy equivalent of the resin with one acid equivalent weight of ricinoleic acid, hydroxy stearic acid or their mixtures. This amount, therefore, is directly dependent on the hydroxy equivalent weight of the resin to be modified and cannot be more than 90 percent by weight of the reactant composition.

The same criteria applies for the trans-esterification reaction with, for example, the methyl ricinoleate, methyl hydroxystearate and their mixtures. The esterification or the trans-esterification reactions can be carried out at between about 120°-250° C., preferably between about 170°-225° C., with or without a catalyst, for a period of 5-10 hours. However, the presence of a small amount of catalyst, i.e., from about 0.01-0.3 weight percent, based on the total charge of the reactants, shortens the reaction time necessary for the completion of the reaction. Catalysts useful in the esterification reaction include: acids such as sulfuric acid, phosphoric acid, para-toluene sulfonic acid; organo tin compounds such as dibutyl tin-(IV) dilaurate; and titanium compounds such as titanium (IV) isoproproxide. The dibutyl-tin-dilaurate and the titanium (IV) isopropoxide are also particularly useful in the trans-esterification reaction.

The esterification reaction can be considered as completed when the acid number of the reaction product is less than or equal to one milligram equivalent of KOH. The trans-esterification reaction with methyl ricinoleate, for example, can be followed by following the methanol distillation on the disappearance of the methyl ricinoleate. The disappearance of the methyl ricinoleate in the reaction product can be determined by gel permeation chromatography. The reaction can be considered as complete when the methyl ricinoleate in the finished product is about one percent by weight of the total composition.

The preparation of the polyols of the present invention can be carried out either with or without a solvent or diluent. The choice depends on the available equipment and the compatibility of the reactants. The resin to be modified is mixed with ricinoleic acid, hydroxystearic acid or a mixture of the two, heated to 170°-225° C. in the presence of 0.05-0.2% of an esterification catalyst and the reaction is continued until the acid value of the reaction product is less than one. Alternatively, the resin to be modified is first heated or melted and then the ricinoleic acid, the hydroxystearic acid or a mixture of the two is added. The reaction is then continued as above. In a further alternative embodiment of the process, the resin to be modified is first dissolved in a solvent and then reacted with ricinoleic acid, hydroxystearic acid or mixtures as above, either under azeotropic conditions or with continuous distillation of the solvent to remove the water formed in the reaction.

In addition, the resin, and a solvent diluent such as methanol may be mixed at ambient temperature with ricinoleic acid, hydrostearic acid or a mixture of the two. This mixture is then heated in presence of an esterification catalyst to 170°–225° C. with distillation to eliminate the methanol and the water of reaction.

Any of the methods described above can also be used in the trans-esterification reaction of a resin with methyl ricinoleate, methyl hydroxystearate or their mixtures. The methyl esters are generally preferred due to the ease with which they are prepared and the ease with which the methanol may be eliminated during the reaction. In this case, the reaction mixture is heated to between about 170°–255°C. in presence of 0.05–0.2% of a trans-esterification catalyst and the reaction is continued until the methyl ricinoleate content of the reaction product is less than one percent by weight.

Since the solvent is partially or entirely distilled during the reaction, any organic solvent may be suitable. Examples of suitable solvents are toluene, xylene, heptane, cyclohexane, acetone, methyl ethyl ketone, ethyl acetate, butyl acetate, methanol, butanol and the like.

At the completion of the reaction, the product is cooled and, depending upon its viscosity and the intended application, it may be dissolved in a suitable solvent. If the product is intended to be used as a polyol in a coating formulation, then it would be convenient to dissolve it in a solvent suitable for that application. A large number of solvents and mixtures of various solvents are used in coatings. Those most commonly used are the VM&P naphthas, mineral spirits, toluene, xylene, ethyl acetate, butyl acetate, methyl ethyl ketone, methyl isobutylketone, the ethylene or propylene glycol ether acetates and chlorinated solvents such as 1, 1, 1, trichloroethane.

The low viscosity polyols of the present invention, either taken alone or in mixtures with other such polyols, can be used to formulate high solids urethane and melamine resin compositions which are useful as adhesives, potting or molding compounds and high solids coatings for plastics, business machine parts, metals, woods and building materials, such as concrete, bricks, cinder blocks and the like. Additionally, applicants' low viscosity polyols may be esterified with an unsaturated monobasic fatty acid compound in an amount sufficient to cause the resulting composition to polymerize in the presence of air or oxygen, thus forming an alkyd resin which may be subsequently be further modified by the addition of a polybasic acid compound to produce useful coatings having a good initial gloss, improved adhesion and exterior durability.

The polyols of the present invention can be cured with isocyanates, either at ambient or higher temperatures and with or without a catalyst. The selection of the isocyanate is very much dependent upon the intended application and the desired properties of the final composition. Solventless isocyanates for example, must be used for molding and potting applications. Aromatic isocyanates can be used in those coating applications where UV resistance is not a primary concern. Aliphatic isocyanates are preferred in coating applications where UV resistance is one of the desired properties. Whatever the nature of the isocyanate, i.e., aromatic or aliphatic, the polymeric, the adducts and the low viscosity prepolymers are preferred since they present a much lower degree of health risk than their monomeric counterpart.

Any urethane catalyst can be used to accelerate the reaction of the polyols of this invention with the chosen isocyanate. The most widely used catalysts are dibutyl tin dilaurate, dibutyl tin diacetate, stannous octoate and tertiary amines such as 1,4 diazabicylo-2,2,2-octane and the like.

When the low viscosity polyols of the present invention are cured with isocyanate compounds to form applicants, improved coating compositions, it has been determined that the relative ratio of the isocyanate moiety (i.e., N=C—O) to the hydroxyl (i.e., OH) function may range from about 0.9–1.8 to 1 and preferably from about 1.05 to 1. The isocyanate compounds which can be used for reaction with the polyol to form the polyurethane coating include aliphatic polyisocyanates, cycloaliphatic polyisocyanates or aromatic polyisocyanates. Typical of such polyisocyanate compounds are 3-isocyanatomethyl-3, 5, 5-trimethyl-cyclohexyl isocyanate (IPDI), toluene diisocyanate (TDI), 4,4,diphenylmethanediisocyanate (MDI), polymethylene polyphenylisocyanate, 1, 5 napthalene diisocyanate, phenylene diisocyanates, 4, 4,'-methylene bis-(cyclohexylisocyanate), hexamethylene diisocyanate, biuret of hexamethylene diisocyanate, 2, 2, 4-trimethylhexamethylene diisocyanate and combinations thereof, as well as related aromatic, aliphatic, and cycloaliphatic polyisocyanates which may be substituted with other organic or inorganic groups that do not adversely affect the course of the reaction.

In alternate applications, i.e., where the isocyanate composition is replaced by a melamine curing agent such as, for example, hexamethoxymethylmelamine (i.e., Cymel 303), the melamine composition represents, after the coating is baked to facilitate the cure, roughly ⅓ of the coating composition on a dry binder basis. The remainder of this material is comprised of ⅓ of the polyol and ⅓ of an acrylic polymer. These proportions should not be construed as limiting, however, since the ratio of each component can range between about 25 and 75 weight percent of the composition or may be further altered within stoichiometric limits to produce coatings useful for a number of proposed applications.

With regard to the formation of alkyd resin coating compositions utilizing the low viscosity polyols of the invention, it has been discovered that esterification of these polyols with a monobasic fatty acid material including, but not limited to soya oil, safflower oil, dehydrated castor oil, linseed oil, coconut oil and castor oil, and optionally, modifying them with a polybasic acid composition such as, for example, phtalic, maleic, fumaric or sebacic acids, or a mixture thereof, provides improved resin compositions over those disclosed in the prior art. The relative ratio of the acid groups to hydroxyl groups from the polyhydric polyol may range from about 1 to 2 up to about 2 to 1. The preferred ratio of these functional moieties is 1:1, however, but any relative amounts of these materials may be utilized depending upon the intended application of the coating or adhesive desired.

It is also possible to form alkyd resins by well known prior art techniques including mixing the low viscosity polyols of the invention with a second polyol, adding other components as required, and heating the overall mixtures in a kettle to form the resin.

For curing these resins, well known drying agents such as one or more metallic soaps, which are well known in the art, can be added to form a coating composition that will air dry. A discussion of suitable metallic soaps can be found in the Encyclopedia of Polymer Science and Technology, Vol. 5, (1966) pp. 126–139.

It is also possible to formulate semi-drying or non-air drying alkyd coatings by limiting or eliminating the amount of unsaturation in the reactive components. By this process, the use of drying agents is unnecessary. One skilled in the art can best decide the optimum formulation for the particular use.

The examples of this application disclose the reactants and their compositions along with the temperatures and reaction times which are advantageous for polyols prepared from specific components or reactants. For other reactants, these variables may be slightly different, but are easily ascertainable by those skilled in the art by routine experimentation.

EXAMPLES

The present invention is further illustrated by the following examples in which all parts are by weight unless otherwise specified. These examples are set forth for the purposes of illustration only and are not to be construed as limiting the invention in any manner:

EXAMPLE 1

A three-neck reaction flask, mounted with a mechanical stirrer, thermometer, condenser and nitrogen inlet was charged with 850 parts of a styrene allyl alcohol copolymer; 447 parts of ricinoleic acid and 425 parts of acetone. The styrene allyl alcohol copolymer, a solid resin, had a hydroxyl value of 255, an equivalent weight of 220, a weight average molecular weight of 1700 and a hydroxyl group content of 7.7 moles per mole of copolymer. The mole ratio of the reactants, therefore, was one mole of styrene-allyl alcohol copolymer and 3 moles of ricinoleic acid or 7.7 equivalents of the copolymer and 3 equivalents of the acid. The mixture was heated with stirring to dissolve the resin and distill the acetone. When the temperature reached 100° C., 0.65 parts of dibutyl tin oxide were added as the esterification catalyst. The temperature was raised to 220° C. and the reaction continued until the water formed in the reaction stopped distilling and the product had an acid value of one or less. The product was cooled to 100° C. and 317.5 parts of butyl acetate were added to form an 80% solution of the product.

The new polyol solution had a Brookfield viscosity of 8,000 cps at 23° C., an acid value of 0.77, and OH value of 122.2, an equivalent weight of 459 and a volatile content of 20.3 parts percent. In comparison, an 80% solution of the unmodified styrene-allyl alcohol copolymer in butyl acetate had a Brookfield viscosity of 350,000 cps. The new polyol, therefore, had a much lower viscosity and a much higher equivalent weight then the unmodified styrene-allyl alcohol copolymer.

EXAMPLE 2

The flask used in Example 1 was charged with 850 parts of the same styrene-allyl alcohol copolymer, 496.2 parts of methyl ricinoleate and 425 parts of methanol. The equivalent weight or molecular weight of the methyl ricinoleate was 330.8 and was calculated based upon its saponification value.

The mole ratio of the two reactants, therefore, was one mole of styrene-allyl alcohol copolymer and 3 moles of methyl ricinoleate or 7.7 and 3 equivalents respectively. The mixture was heated with stirring to dissolve the resin and to distill the methanol. When the temperature was 100° C., 0.7 parts of titanium (IV) isopropoxide was added and the temperature was raised to 220° C. The reaction was continued at this temperature until the methyl ricinoleate content of the product, as determined by gel permeation chromatography, was one part or less. Then the product was cooled to 100° C. and 324.5 parts of butyl acetate were added.

The final product was a polyol having a Brookfield viscosity of 4,200 cps at 25° C., an acid value of 0.1, an OH value of 126.5, a methyl ricinoleate content of 0.51 and a volatile content of 20.9 parts per one hundred parts of the solution.

EXAMPLE 3

The flask used in Example 1 was charged with 510 parts of the same styrene-allyl alcohol copolymer, 277.87 parts of the methyl ricinoleate of Example 2 and 255 parts of methanol. The mole ratio of the reactants was one mole of the styrene-allyl alcohol copolymer and 2.8 moles of the methyl ricinoleate. The procedure was similar to the one described in Example 2, except that 0.4 parts of titanium (IV) isopropoxide and 190.25 parts of butyl acetate were used in this example.

The product had a Brookfield viscosity of 3,650 cps at 25° C., an acid value of 0.15, an OH value of 129.1, a methyl ricinoleate content of 0.5 parts percent and a volatile content of 20.8 parts percent.

EXAMPLE 4

The flask used in Example 1 was charged with 510 parts of the same styrene -allyl alcohol copolymer, 277.87 parts of the methyl ricinoleate of Example 2 and 255 parts of methanol. The ratio was one mole of the copolymer and four moles of the methyl ricinoleate. The process was similar to the one described in Example 2, except that 0.5 parts of titanium (IV) isopropoxide and 218.5 parts of butyl acetate were used in this example.

The product had a Brookfield viscosity of 1920 cps. at 25° C., an acid value of 0.2, an OH value of 117.6 and a volatile content of 21.1 parts percent.

EXAMPLE 5

The reaction flask used in Example 1 was charged with 425 parts of the same styrene-allyl alcohol copolymer, 393.5 parts of a methyl ricinoleate having a molecular weight of 314.8 and 340 parts of methanol. The mole ratio was one mole of the copolymer and 5 moles of the methyl ricinoleate. The procedure was similar to the one described in Example 2, except that 0.82 parts of titanium (IV) isopropoxide and 194.63 parts of butyl acetate were used in this example.

The product had a Brookfield viscosity of 1,550 cps at 25° C., an acid value of 0.2, an OH value of 99 and a volatile content of 80 parts percent.

EXAMPLE 6

The flask used in Example 1 was charged with 425 parts of the same styrene-allyl alcohol copolymer, 467.8 parts of a methyl ricinoleate having a molecular weight of 311.9 and 255 parts of methanol. The mole ratio was one mole of copolymer and 6 moles of methyl ricinoleate. The procedure was similar to the one described in Example 2, except that 0.89 parts of titanium (IV) isopropoxide and 211.2 parts of butyl acetate were used in this example.

The final product had a Brookfield viscosity of 1,010 at 25° C., an acid value of 0.16, an OH value of 100.4 and a volatile content of 20.4 parts percent.

EXAMPLE 7

The flask used in Example 1 was charged with 307.7 parts of the same styrene-allyl alcohol copolymer, 393.9 parts of the same methyl ricinoleate used in Example 6 and 185 parts of methanol. The mole ratio of the reactants was one mole of the copolymer and 7 moles of methyl ricinoleate. The procedure was similar to the one described in Example 2, except that 0.8 parts of titanium (IV) isopropoxide and 165.3 parts of butyl acetate were used in this example.

The product had a Brookfield viscosity of 720 cps at 25° C., an acid value of 0.2, an OH value of 97.5 and a volatile content of 20.1 parts percent.

EXAMPLE 8

The flask used in Example 1 was charged with 234 parts of a styrene-allyl alcohol copolymer, 157.4 parts of a methyl ricinoleate and 200 parts of methanol. The styrene-allyl alcohol copolymer had an OH value of 187, an equivalent weight of 300 and a weight average molecular weight of 2340. The methyl ricinoleate had an equivalent weight or a molecular weight of 314.9. The mole ratio was one mole of the styrene-allyl alcohol copolymer and 5 moles of the methyl ricinoleate. The procedure was similar to the one in Example 2, except that 0.39 parts of titanium (IV) isopropoxide and 93.75 parts of butyl acetate were used in this example.

The final product had a Brookfield viscosity of 4700 cps at 25° C., an acid value of 0.11, an OH value of 86.2 and a volatile content of 20 parts percent.

This experiment indicates that substitution of the styrene allyl alcohol copolymer of Example 5 with the styrene-allyl alcohol copolymer of this example leads to products having much higher viscosities.

EXAMPLE 9

The reaction flask used in Example 1 was charged with 340 parts of the same styrene-allyl alcohol copolymer, 438.2 parts of methyl hydroxyl stearate and 350 parts of methanol. The methyl hydroxy stearate had an equivalent weight or molecular weight of 313. The mole ratio of the two reactants was one mole of the styrene-allyl alcohol copolymer and 7 moles of the methyl hydroxy stearate. The procedure was similar to the one in Example 2, except that 0.8 parts of titanium (IV) isopropoxide and 183.3 parts of butyl acetate were used in this example.

The product was somewhat cloudy and had an acid value of 0.2, an OH value of 90.7 and a volatile content of 20 parts percent.

EXAMPLE 10

The reaction flask used in Example 1 was charged with 510 parts of the same styrene-allyl alcohol copolymer, 360 parts of hydroxystearic acid, 180 parts of ricinoleic acid and 350 parts of methanol. The mole ratio of the reactants was 1 mole of the styrene-allyl alcohol copolymer, 4 moles of the hydroxy stearic acid and 2 moles of the ricinoleic acid. The procedure was similar to that of Example 1, except that 0.5 parts of dibutyl tin oxide and 254.5 parts of methyl isobutyl ketone were used in this example.

The final product had a Brookfield viscosity of 1600 cps at 25° C., an acid value of 0.42, an OH value of 92.3 and a volatile content of 20.3 parts percent.

EXAMPLE 11

The flask used in Example 1 was charged with 340 parts of the same styrene-allyl alcohol copolymer, 250.4 parts of methyl hydroxystearate, 125.2 parts of methyl ricinoleate and 204 parts of methanol. The mole ratio of the reactants was one mole of the styrene-allyl alcohol copolymer, 4 moles of the methyl hydroxy stearate and 2 moles of the methyl ricinoleate. The process was similar to the one used in Example 2, except that 0.7 parts of titaninum (IV) isopropoxide and 169.3 parts of the butyl acetate were used in this example.

The product had a Brookfield viscosity of 1350 cps at 25° C., an acid value of 0.16, an OH value of 93.6 and a volatile content of 19.9 parts percent.

EXAMPLE 12

The flask used in Example 1 was charged with 340 parts of the same styrene-allyl alcohol copolymer, 250.4 parts of methyl hydroxyl stearate, 187.8 parts of methyl ricinoleate and 204 parts of methanol. The mole ratio of the reactants was one mole of the styrene allyl alcohol copolymer, 4 moles of the methyl hydroxyl stearate and 3 moles of the methyl ricinoleate. The procedure was similar to the one in Example 2, except that 0.8 parts of titaninum (IV) isopropoxide and 183.35 parts of butyl acetate were used in this example.

The product had a Brookfield viscosity of 845 cps at 25° C., an acid value of 0.21, an OH value of 88 and a volatile content of 21.1 parts percent.

EXAMPLE 13

The flask used in Example 1 was charged with 200 parts of a polyester polyol, 400 parts of methyl ricinoleate and 0.6 parts of titaninum (IV) isopropoxide. The polyester polyol had an OH value of 400 and an equivalent weight of 140, the methyl ricinoleate had an equivalent weight of 317.9. The ratio of the reactants was 33.33 parts percent of the polyester polyol and 66.66 parts percent of the methyl ricinoleate. No solvent or diluent was used during the reaction. The mixture was heated to 225° C. and the reaction continued until the methyl ricinoleate contents of the product was 0.6 parts percent. The product was cooled to room temperature and no solvent was added.

The product had a Brookfield viscosity of 1660 cps at 25° C., an acid value of 0.67 and an OH value of 156.3. For comparison the unmodified polyester polyol, before the reaction, had a Brookfield viscosity of 35,800 cps at 25° C.

EXAMPLE 14

The flask used in Example 1 was charged with 210 parts of methyl ethyl ketone, 90 parts of a phenoxy resin and 79 parts of methyl ricinoleate. The phenoxy ester, prepared from bisphenol A and epichlorohydrin, had an equivalent weight of 283 and softening temperature of 100° C. The ratio of the reactants was 1 equivalent weight of the phenoxy resin and 0.8 equivalent weight of the methyl ricinoleate. The mixture was heated with stirring to dissolve the phenoxy resin. When all of the phenoxy resin was in solution, 0.17 parts of titanium (IV) isopropoxide were added. The temperature was raised slowly to 220° C. to distill off the methyl ethyl ketone first and then the methanol from the transesterification reaction. At the end of the reaction, the product was cooled to 100° C. and 100 parts of a 50/50 mixture of xylene and methyl ethyl ketone were added.

The final product had a Brookfield viscosity of 570,000 cps at 25° C., an acid value of 0.11, an OH value of 89.1 and a non-volatile resin content of 63.2 parts percent. When this resin solution was diluted to 30% solids with the same solvent mixture, it had a Brookfield viscosity of only 165 cps at 25° C. By contrast the unmodified phenoxy resin was insoluble in the same solvent mixture.

As demonstrated by the preceeding examples the polyols of the present invention, when mixed with polyisocyanates and optionally, small amounts of a catalyst and solvent, yield polyurethane compositions which are useful as high solids, sprayable coatings.

The pencil hardness, the methyl ethyl ketone resistance and the VOC of the clear polyurethane films obtained from these polyols are summarized in Table 1.

All of the polyols were cured at room temperature with Mondur CB-75, a toluene di-isocyanate based adduct produced by the Mobay Chemical Company. The NCO/OH ratio was 1:1. A 0.01 part of dibutyl tin dilaurate per 100 parts of solid polyol was used as the catalyst. The pencil hardness and the methyl ethyl ketone resistance of 1.5 mill thick, clear films on Bonderite 100 were determined after the films were cured for one week at room temperature. The VOC, calculated in pounds of volatiee organic compounds per gallon, was determined by calculating the total amount of volatile in each composition after dilution to a sprayable viscosity of 55 cps with methyl isobutyl ketone.

TABLE 1

| Polyol from Example | Pencil Hardness | Flexibility (¼" Mandrel.) | MEK Double Rubs | VOC lbs/gal. |
|---|---|---|---|---|
| Control A[1] | 3H | fail | 100+ | 3.94 |
| 1 | H | pass | 100+ | 3.47 |
| 2 | 2H | pass | 100+ | 3.43 |
| 3 | 2H | pass | 100+ | 3.46 |
| 4 | 2H | pass | 100+ | 3.34 |
| 5 | 2H | pass | 100+ | 3.32 |
| 6 | 2H | pass | 100+ | 3.29 |
| 7 | 2H | pass | 100+ | 3.23 |
| Control B[2] | 2H | fail | 100+ | 3.87 |
| 8 | H | pass | 100+ | 3.30 |
| 9 | H | pass | 100+ | 3.25 |
| 10 | 2H | pass | 100+ | 3.13 |
| 11 | H | pass | 100+ | 3.27 |
| 12 | H | pass | 100+ | 3.22 |
| Control C[3] | 3H | fail | 100+ | 3.75 |
| 13 | 2H | pass | 100+ | 2.7 |
| Control D[4] | 4H | fail | 100+ | — |
| 14 | 3H | pass | 100+ | — |

[1] Control A is the styrene - allyl alcohol compolymer used in the Example 1 thru 7 and 9 thru 12.
[2] Control B is the styrene-allyl alcohol copoylmer used in the Example 8.
[3] Control C is the polyester polyol used in the Example 13.
[4] Control D is the phenoxy resin used in the Example 14.

As is shown in Table 1, the polyols of the present invention generally have a pencil hardness which is one unit lower than the respective controls or unmodified resins, but a much improved flexibility.

All of the polyols and their controls have a good methyl ethyl ketone resistance as shown by the MEK rubbing test. All of the urethane compositions containing the polyols of this invention have much lower VOC's than those compositions containing the controls or the unmodified resins.

The VOC of the urethane compositions containing the new polyols decreases with the increasing of the ricinoleate or hydroxy stearate modification. When these polyols are properly pigmented they yield higher solids polyurethane coatings useful in a variety of applications.

While it is apparent that the invention herein disclosed is well calculated to fulfill the desired results, it will be appreciated that numerous modifications and embodiments may be devised by those skilled in the art, and it is intended that the appended claims cover all such modifications and embodiments as fall within the true spirit and scope of the present invention.

What is claimed is:

1. A low viscosity polyol which comprises a high viscosity or solid resin containing at least two hydroxyl groups at least one of which is esterified with ricinoleic acid, hydroxystearic acid or mixtures thereof to form a polyol having a lower viscosity than the resin without reducing the hydroxy functionality below that of the resin.

2. A low viscosity polyol which comprises a high viscosity or solid resin containing at least two hydroxyl groups at least one of which is esterified with a ricinoleate ester, a hydroxystearate ester or mixtures thereof by a transesterification reaction to form a polyol having a lower viscosity than the resin without reducing the hydroxy functionality below that of the resin.

3. A low viscosity polyol which comprises: a high viscosity resin containing at least two hydroxyl groups, said resin comprising a hydroxy terminated polyester, a copolymer of allyl alcohol and a vinyl monomer, a copolymer of bisphenol A and epichlorohydrin, or mixtures thereof, wherein at least one of said hydroxyl groups of said resin is esterified with ricinoleic acid, hydroxystearic acid, a ricinoleate ester, a hydroxystearate ester, or mixtures thereof to form a polyol having a lower viscosity than the resin without reducing the hydroxyl functionality below that of the resin.

4. The polyol of claim 1 or 2 wherein said high viscosity resin is an allyl alcohol copolymer prepared by the copolymerization reaction of allyl alcohol and a vinyl mononer.

5. The polyol of claim 4 wherein said vinyl monomer is styrene.

6. The polyol of claim 1 or 2 wherein said resin is a polyester resin.

7. The polyol of claim 6 wherein said polyester resin is prepared by a condensation reaction between a polyhydric alcohol and a polycarboxylic acid or anhydride compound.

8. The polyol of claim 7 wherein said polyhydric alcohol is ethylene glycol, propylene glycol, 1,4 butane diol, 2,2 dimethyl-1,3 propane diol, or trimethylolpropane.

9. The polyol of claim, 7 wherein said polycarboxylic acid compound is oxalic acid, malonic acid, succinic acid, glutaric acid, adipic acid, phthalic acid, isophthalic acid, cyclohexane dicarboxylic acid, or one of their corresponding anhydrides.

10. The polyol of claim 1 or 2 wherein said resin component comprises between about 10 and 90 weight percent and said acid or ester component comprises between about 90 and 10 weight percent of said polyol.

11. A process for preparing low viscosity polyols which comprises reacting a high viscosity resin which contains at least two hydroxyl groups with ricinoleic acid, hydroxystearic acid or mixtures thereof at a sufficient temperature and for a sufficient period of time to react one of the hydroxyl groups of the resin with said acid to form a polyol having a lower viscosity than said resin without reducing the hydroxyl functionality below that of the resin.

12. A process for preparing low viscosity polyol which comprises reacting a high viscosity resin which contains at least two hydroxyl groups with a ricinoleic ester, a hydroxystearic ester or mixtures thereof at a sufficient temperature and for a sufficient period of time to react one of the hydroxyl groups of the resin with said ester to form a polyol having a lower viscosity than said resin without reducing the hydroxyl functionality below that of the resin.

13. The process of claim 12 said ester is a methyl, propyl, or butyl ester.

14. The process of claim 11 or 12 wherein said temperature ranges from between about 120° to 250° C.

15. The process of claim 14 wherein said temperature ranges from between about 170° to 225° C.

16. The process of claim 11 or 12 wherein said sufficient period of time ranges between about one and three hours.

17. The process of claim 11 or 12 which further comprises reacting said resin with said acid or ester in the presence of a catalyst.

18. The process of claim 17 wherein said catalyst is selected from the group consisting of an acid, an organotin compound and a titanium compound in an amount of between about 0.01 to 0.3 weight percent based on the total weight of the reactants.

19. The process of claim 18 wherein said acid is sulfuric acid, phosphoric acid or para-toulene sulfonic acid.

20. The process of claim 18 wherein said organotin compound is dibutyltin-(IV) dilaurate.

21. The process of claim 18 wherein said titanium compound is titanium (IV)-isoproproxide.

22. The process of claim 11 or 12 wherein said resin component comprises between about 10 and 90 weight percent and said acid or ester component comprises between about 90 and 10 weight percent of said polyoi.

23. A process for preparing low viscosity polyols which comprises:
reacting a high viscosity resin which contains at least two hydroxyl groups with ricinoleic acid, hydroxystearic acid or mixtures thereof at a temperature of between about 170°-225° C. in the presence of between about 0.05-0.2% of an esterification catalyst until the acid content of the reaction product is less than one.

24. A process for preparing low viscosity polyols which comprises:
reacting a high viscosity resin which contains at least two hydroxyl groups with a ricinoleate ester, a hydroxystearate ester or mixtures thereof at a temperature of between about 170°-225° C. in the presence of between about 0.05-0.2% of a trans-esterification catalyst until the ester content of the reaction product is less than one.

25. The process of claim 23 or 24 which further comprises heating or melting said resin prior to the addition of said acid or ester component.

26. The process of claim 23 or 24 which further comprises dissolving said resin in a suitable solvent prior to the addition of said acid or ester component.

27. The process of claim 26 wherein said resin is reacted with said acid or ester either under azeotropic conditions or with continuous distillation of said solvent to remove any water which may be formed during the reaction.

28. A process for preparing low viscosity polyols which comprises:
combining a high viscosity resin which contains at least two hydroxyl groups, an organic solvent, an esterification catalyst, and ricinoleic acid, hydroxystearic acid, or mixtures thereof to form a solution; and
heating said solution to a temperature of between about 170°-225° C. to distill the solvent, to eliminate water which is produced by the reaction, and to complete the reaction, thus forming the low viscosity polyols.

29. A process for preparing low viscosity polyols which comprises:
combining a high viscosity resin which contains at least two hydroxyl groups, an organic solvent, a trans-esterification catalyst, a ricinoleate ester, hydroxystearate ester, or mixture thereof to form a solution; and
heating said solution to a temperature of between, about 170°-225° C. to distill the solvent, to eliminate the alcohol which is produced by the reaction, and to complete the esterification reaction, thus forming the low viscosity polyols.

30. The process of claim 29 wherein the ricinoleate ester is methyl ricinoleate or the hydroxystearate ester is methyl hydroxystearate.

31. The process of claim 28 or 29 wherein said organic solvent toluene, xylene, heptane, cyclohexane, acetone, methyl ketone, ethyl acetate, butyl acetate, methanol or butanol.

32. The process of claim 28 or 29 which further comprises:
cooling said second solution to form a solid product; and
recovering said product, optionally by dissolving said product in a suitable organic solvent.

33. The process of claim 28 or 29 wherein said organic solvent is a VM&P naphtha, minaeral spirit toluene, xylene, ethyl acetate, butyl acetate, methy ethyl ketone, methyl isobutylketone, an ethylene or propylene glycol ether acetate or a chlorinated solvent.

34. The product produced by the process of claim 11.

35. The product produced by the process of claim 12.

36. The product produced by the process of claim 17.

37. The product produced by the process of claim 23.
38. The product produced by the process of claim 24.
39. The product produced by the process of claim 28.
40. The product produced by the process of claim 29.
41. A low viscosity polyol which comprises between about 10 and 90 weight percent of a high viscosity or solid resin containing at least two hydroxyl groups at least one of which is esterified with between about 90 and 10 weight percent of an organic acid having at least one hydroxyl group, so as to form a polyol having a lower viscosity than the resin without reducing the hydroxyl functionality below that of the resin.
42. A low viscosity polyol which comprises between about 10 and 90 weight percent of a high viscosity or solid resin containing at least two hydroxyl groups at least one of which is esterified with between about 90 and 10 weight percent of an ester of an organic acid, said ester having at least one hydroxyl group, so as to form a polyol having a lower viscosity than the resin without reducing the hydroxyl functionality below that of the resin.
43. A process for preparing low viscosity polyols which comprises reacting between about 10 and 90 weight percent of a high viscosity resin which contains at least two hydroxyl groups with an organic acid having at least one hydroxyl group at a sufficient temperature and for a sufficient period of time to react one of the hydroxyl groups of the resin with said acid to form a polyol having a lower viscosity than said resin without reducing the hydroxyl functionality below that of the resin.
44. A process for preparing low viscosity polyols which comprises reacting between about 10 and 90 weight percent of a high viscosity resin which contains at least two hydroxyl groups with between 90 and 10 weight percent of an ester of an organic acid, said ester having at least one hydroxyl group, at a sufficient temperature and for a sufficient period of time to react one of the hydroxyl groups of the resin with said acid to form a polyol having a lower viscosity than said resin without reducing the hydroxyl functionality below that of the resin.
45. The product produced by the process of claim 43.
46. The product produced by the process of claim 44.

* * * * *